(12) United States Patent
Wang et al.

(10) Patent No.: US 11,611,111 B2
(45) Date of Patent: Mar. 21, 2023

(54) WOUND-TYPE BATTERY CELL (71) Applicant: NINGDE AMPEREX TECHNOLOGY LIMITED, Ningde (CN)

(72) Inventors: Kefei Wang, Ningde (CN); Fei Wu, Ningde (CN); Jinli Wang, Ningde (CN); Jibin Geng, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 796 days.

(21) Appl. No.: 16/454,875

(22) Filed: Jun. 27, 2019

(65) Prior Publication Data
US 2019/0393558 A1    Dec. 26, 2019

Related U.S. Application Data (63) Continuation of application No. PCT/CN2017/117992, filed on Dec. 22, 2017.

(51) Int. Cl.
*H01M 10/0587* (2010.01)
*H01M 10/04* (2006.01)
(Continued)

(52) U.S. Cl.
CPC ... *H01M 10/0587* (2013.01); *H01M 10/0431* (2013.01); *H01M 10/0525* (2013.01);
(Continued)

(58) Field of Classification Search
CPC ............ H01M 10/0431; H01M 10/0587
See application file for complete search history.

(56) References Cited

U.S. PATENT DOCUMENTS

2004/0180259 A1* 9/2004 Kim ............ H01M 50/543
429/129

FOREIGN PATENT DOCUMENTS

| CN | 101150184 A | 3/2008 |
| CN | 106025377 A | 10/2016 |

(Continued)

OTHER PUBLICATIONS

Ningde Amperex Technology Limited, International Search Report and Written Opinion, PCT/CN2017/117992, dated Mar. 28, 2018, 14 pgs.

*Primary Examiner* — Stephan J Essex
(74) *Attorney, Agent, or Firm* — Morgan, Lewis & Bockius LLP (57) ABSTRACT

A cell includes a flat electrode assembly formed by superposing and winding respective first ends of a first electrode sheet, a first separator, a second electrode sheet, and a second separator. A first electrode tab is connected to the first electrode sheet, and a second electrode tab is connected to the second electrode sheet. The second electrode sheet includes a second current collector, a second outer membrane arranged on a surface facing away from a center of the cell, and a second inner membrane arranged on a surface facing the center of the cell. Respective starting ends of the second outer membrane and the second inner membrane are located on the second current collector between the first end of the second electrode sheet and a second bend. The second inner membrane is provided with an inner uncoated region at least at the second bend.

20 Claims, 6 Drawing Sheets

(51) Int. Cl.
*H01M 10/0525* (2010.01)
*H01M 50/538* (2021.01)
*H01M 50/466* (2021.01)
*H01M 50/536* (2021.01)

(52) U.S. Cl.
CPC ....... *H01M 50/466* (2021.01); *H01M 50/538* (2021.01); *H01M 50/536* (2021.01)

(56) References Cited

FOREIGN PATENT DOCUMENTS

| | | | |
|---|---|---|---|
| CN | 205828571 U | 12/2016 | |
| CN | 206401456 U | 8/2017 | |
| EP | 2999041 A1 * | 3/2016 | ........ H01M 10/0431 |
| JP | 2008186708 A | 8/2008 | |

* cited by examiner

WOUND-TYPE BATTERY CELL

CROSS-REFERENCE TO RELATED APPLICATION

This application is a continuation application of PCT Patent Application No. PCT/CN2017/117992, filed on Dec. 22, 2017, which claims priority to Chinese Patent Application No. 201621440668.9, filed on Dec. 27, 2016, all of which are hereby incorporated by reference in their entirety.

TECHNICAL FIELD

The present disclosure relates to a technical field of secondary batteries, and more particularly, to a cell.

BACKGROUND

Figure 1:
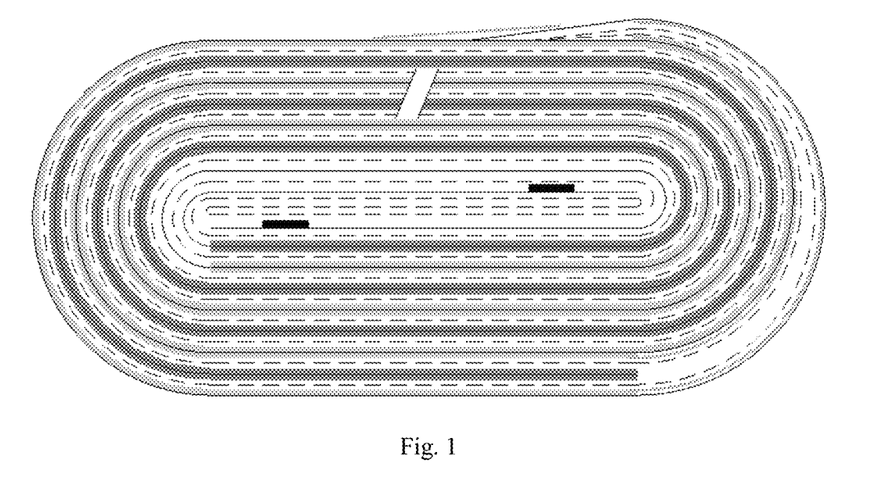
FIG. 1 is a structural schematic diagram of a cell in the related art.

With the increasing demand for battery endurance, new challenges are posed to the energy density of polymer lithium-ion batteries. Traditional methods to increase the energy density of batteries mainly focus on improvements of battery constructions (e.g. thinner current collectors, separators, casings, etc.) and manufacturing processes (e.g. increasing the compaction density of positive and negative electrode active materials to increase unit capacity, etc.). But further reduction of the thickness, such as the thicknesses of current collectors and separators, will not only increase the risk of short circuit of batteries, but also puts forward higher requirements for material production and manufacturing processes. As shown in FIG. 1, the wound electrode assembly disclosed in the art has a relatively large uncoated region in the innermost layer, which reduces the weight percentage of the active materials and is unfavorable for improving the energy density of the battery.

The present disclosure is proposed in view of the defects in the related art.

SUMMARY

An objective of the present disclosure is to provide a cell.

In order to achieve the objective, the technical solutions are adopted as follows.

The present disclosure relates to a cell. The cell includes a flat electrode assembly formed by superposing and winding respective first ends of a first electrode sheet, a first separator, a second electrode sheet and a second separator. A first electrode tab is connected to the first electrode sheet, and a second electrode tab is connected to the second electrode sheet.

The second electrode sheet includes a second current collector, and a second outer membrane and a second inner membrane arranged on opposite surfaces of the second current collector. The second outer membrane is arranged on the first surface facing away from the center of the cell, and the second inner membrane is arranged on the second surface facing the center of the cell;

A center line of the flat electrode assembly in a width direction defines a cell midline, the first electrode sheet includes a first bend where the first electrode sheet first bends, and the second electrode sheet includes a second bend where the second electrode sheet first bends. The first bend and the second bend are located at two sides of the cell midline.

Respective starting ends of the second outer membrane and the second inner membrane are located on the second current collector between the first end of the second electrode sheet and the second bend. The second surface includes an inner uncoated region at least at the second bend, wherein the inner uncoated region is not provided with the second inner membrane.

Preferably, a head of the second electrode sheet extends from the first end of the second electrode sheet to the second bend, the second electrode tab is arranged on the head of the second electrode sheet, and a side of the second electrode tab away from the second bend is an outer side of the second electrode tab; the starting end of the second outer membrane and the starting end of the second inner membrane are located on the second current collector between the outer side of the second electrode tab and the second bend. And, the second outer membrane or the second inner membrane is provided with a second groove therefore a portion of the second current collector is exposed, the second electrode tab being located in the second groove.

Preferably, the first end of the first electrode sheet is folded back inside the flat electrode assembly to form a first folded-back section, a folded-back point of the first folded-back section defines a first folded-back point. And/or, the first end of the second electrode sheet is folded back inside the flat electrode assembly to form a second folded-back section, a folded-back point of the second folded-back section defines a second folded-back point.

Preferably, in a thickness direction of the flat electrode assembly, not more than two layers of the first separator and the second separator which continuously overlap on the innermost side of the cell at a position corresponding to the first electrode tab and/or the second electrode tab.

Preferably, at least one of the first end of the first separator and the first end of the second separator is folded back inside the flat electrode assembly to form a separator folded-back section.

Preferably, a point where a portion of the second electrode sheet covered with the second inner membrane and/or the second outer membrane bends for the last time defines a second tail bending point. From the second bend to the second tail bending point, the second inner membrane or the second outer membrane is provided with a second groove therefore a portion of the second current collector is exposed, the second electrode tab being located in the second groove.

Additionally or alternatively, the first electrode sheet includes a first current collector, and a first outer membrane and a first inner membrane which are arranged on opposite surfaces of the first current collector, the first outer membrane being arranged on the first surface of the first current collector facing away from the center of the cell, while the first inner membrane being arranged on the second surface of the first current collector facing the center of the cell.

A point where a portion of the first electrode sheet covered with the first inner membrane and/or the first outer membrane bends for the last time defines a first tail bending point; from the first bend to the first tail bending point, the first inner membrane or the first outer membrane is provided with a first groove therefore a portion of the first current collector is exposed, the first electrode tab being located in the first groove.

Preferably, a point where a portion of the second electrode sheet covered with the second inner membrane and/or the second outer membrane bends for the last time defines a second tail bending point; from the second tail bending point to a tail end of the second electrode sheet, the second inner membrane or the second outer membrane is provided with a second groove therefore a portion of the second current collector is exposed, the second electrode tab being located in the second groove.

Additionally or alternatively, the first electrode sheet includes a first current collector, and a first outer membrane and a first inner membrane which are arranged on opposite surfaces of the first current collector, the first outer membrane being arranged on the first surface of the first current collector facing away from the center of the cell, while the first inner membrane being arranged on the second surface of the first current collector facing the center of the cell.

A point where a portion of the first electrode sheet covered with the first inner membrane and/or the first outer membrane bends for the last time defines a first tail bending point; from the first tail bending point to a tail end of the first electrode sheet, the first inner membrane or the first outer membrane is provided with a first groove therefore a portion of the first current collector is exposed, the first electrode tab being located in the first groove.

Preferably, a separator end section only consisting of the first separator and/or the second separator is provided at an end of the flat electrode assembly.

Preferably, the outermost circle of the first electrode sheet includes a first uncoated region, and a portion of the second electrode sheet includes a second uncoated region. The portion of the second electrode sheet is opposite to a surface of the first uncoated region facing the center of the cell.

Preferably, the outermost circle of the first electrode sheet includes a first bare portion which is formed by extending the first current collector without coating, and a portion of the second electrode sheet includes a second bare portion which is formed by extending the second current collector without the second membrane. The second bare portion is opposite to a surface of the first bare portion area facing away from the center of the cell.

Technical solutions of the present disclosure have at least the following beneficial effects.

The technical solutions of the present disclosure can effectively reduce the risk of lithium deposition during use while increasing the area coated with the active materials.

REFERENCE SIGNS

1—cell;
   10—first electrode sheet;
      101—first current collector;
      102—first inner membrane;
      103—first outer membrane;
      104—first folded-back section;
      105—first tail bending point;
      106—first bare portion;
      107—first uncoated region;
      108—first bend;
   20—second electrode sheet;
      201—second current collector;
      202—second inner membrane;
      203—second outer membrane;
      204—second folded-back section;
      205—second tail bending point;
      206—second bare portion;
      207—second uncoated region;
      208—second bend;
   30—first separator;
   40—second separator;
   50—first electrode tab;
   60—second electrode tab;
   70—inner uncoated region;
   80—separator folded-back section;
   90—separator end section.

DETAILED DESCRIPTION

The present disclosure will be further illustrated below with reference to specific embodiments. It should be understood that these embodiments are only used to explain the present disclosure rather than limit the scope of the present disclosure.

Figure 2:
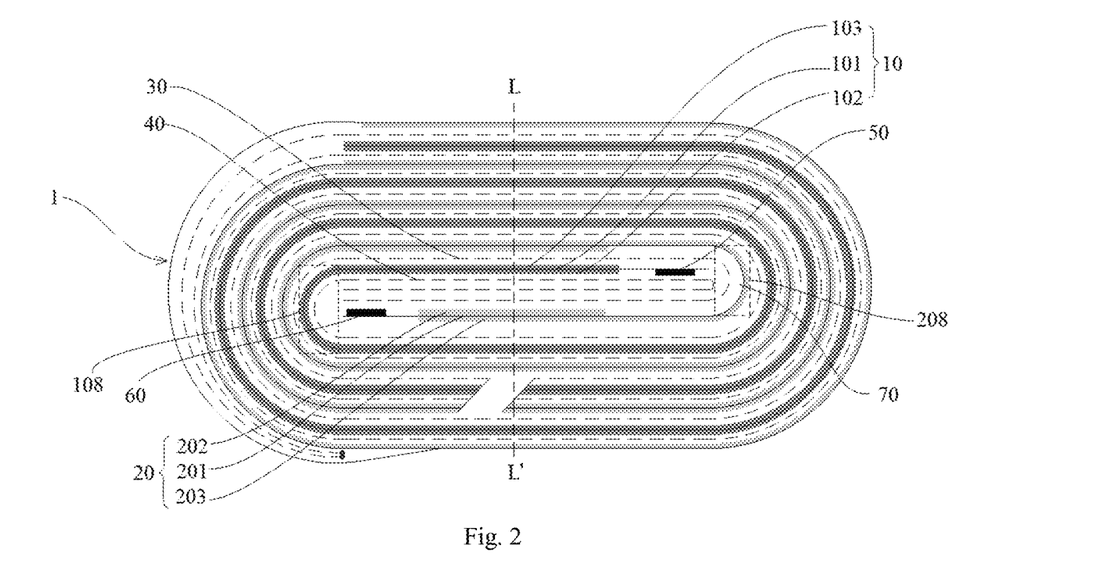
FIG. 2 is a structural schematic diagram of a cell according to a specific embodiment of the present disclosure.

The specific embodiments of the present disclosure relate to a cell 1. As shown in FIG. 2, the cell 1 includes a flat electrode assembly formed by superposing and winding respective first ends of a first electrode sheet 10, a first separator 30, a second electrode sheet 20 and a second separator 40. A first electrode tab 50 is connected to the first electrode sheet 10, and a second electrode tab 60 is connected to the second electrode sheet 20. The second electrode sheet 20 includes a second current collector 201, and a second outer membrane 203 and a second inner membrane 202 which are arranged on opposite surfaces of the second current collector 201. The second outer membrane 203 is arranged on the first surface of the second current collector facing away from a center of the cell, and the second inner membrane 202 is arranged on the second surface of the second current collector facing the center of the cell. A center line of the flat electrode assembly in a width direction defines a cell midline L-L', an area where the first electrode sheet 10 is bent for the first time defines a first bend 108 (shown as dotted line in FIG. 2), and an area where the second electrode sheet 20 is bent for the first time defines a second bend 208 (shown as dotted line in FIG. 2). The first bend 108 and the second bend 208 are located at two sides of the cell midline L-L'. That is, the first bend and the second bend in the cell according to an embodiment of the present disclosure face each other.

The wound electrode assembly disclosed in the art has a relatively large uncoated region in the innermost layer. According to an embodiment of the present disclosure, respective starting ends of the second outer membrane 203 and the second inner membrane 202 are located on the second current collector 201 between the first end of the second electrode sheet 20 and the second bend 208, such that the area coated with active materials is increased, and thus the space inside the cell is fully utilized and the energy density of the cell is improved. Furthermore, the second inner membrane 202 is provided with an inner uncoated region 70 at least at the second bend 208. According to an embodiment of the present disclosure, the second electrode sheet 20 can be a cathode electrode sheet, such that the cathode sheet is designed as an uncoated region in an area which is not covered by an anode electrode membrane, and thus the cathode membrane is completely covered by an anode membrane, therefore a risk of lithium deposition is minimized. In order to better avoid the risk of lithium deposition, an uncoated region can also be provided in the second current collector around the second bend.

Figure 3:
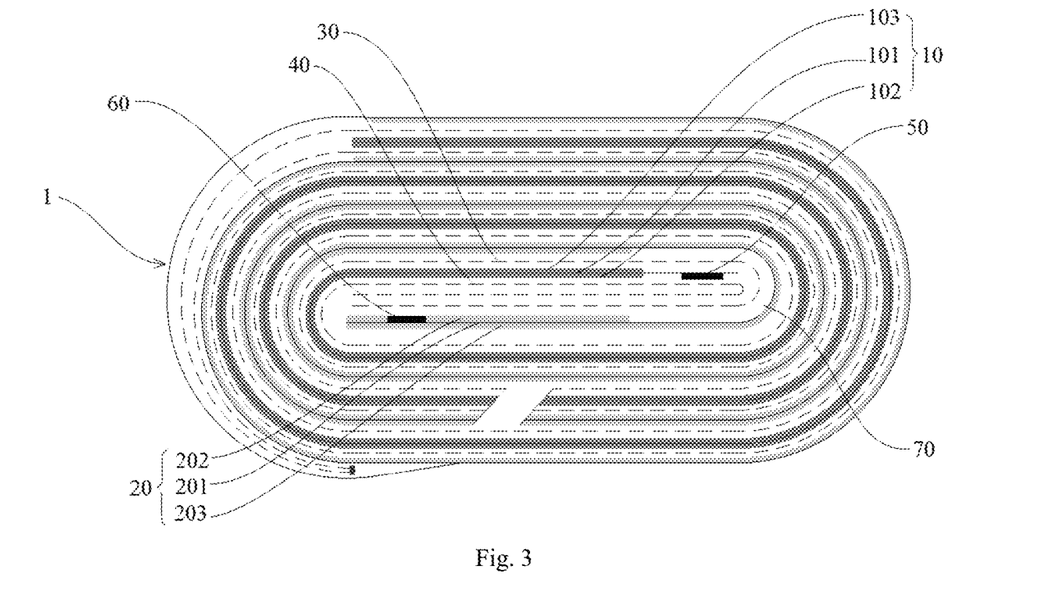
FIG. 3 is a structural schematic diagram of a cell according to a specific embodiment of the present disclosure.

According to an embodiment of the present disclosure, as shown in FIG. 3, a head of the second electrode sheet 20 extends from the first end of the second electrode sheet 20 to the second bend 208, the second electrode tab 60 is arranged on the head of the second electrode sheet 20. A side of the second electrode tab 60 away from the second bend 208 defines an outer side of the second electrode tab 60. The starting ends of the second outer membrane 203 and the second inner membrane 202 are located on the second current collector 201 between the outer side of the second electrode tab 60 and the second bend 208. And, the second outer membrane 203 or the second inner membrane 202 is provided with a second groove (not shown in the drawings) for exposing the current collector therein, the second electrode tab 60 being located in the second groove. Therefore, the space inside the cell is fully utilized, and the energy density of the cell is improved.

According to an embodiment of the present disclosure, the groove can be designed as a narrow groove with three sides surrounded by the membrane. According to another embodiment of the present disclosure, the groove can be designed as a deep groove penetrating the electrode sheet in a width direction, i.e., with two sides surrounded by the membrane.

Further preferably, the starting ends of the second outer membrane 203 and the second inner membrane 202 are both located at the first end of the first electrode sheet 10, thereby maximizing the use of the space inside the cell.

Further preferably, the first electrode sheet 10 includes a first current collector 101, and a first outer membrane 103 and a first inner membrane 102 which are arranged on opposite surfaces of the first current collector 101. The first outer membrane 103 is arranged on a surface facing away from the center of the cell, and the first inner membrane 102 is arranged on a surface facing the center of the cell. A starting point of the first outer membrane 103 can be located anywhere from the first end of the first electrode sheet 10 to the first bend 108. For example, the first electrode tab 50 can be located on a surface of the first electrode sheet 10 facing a center of a battery, and the starting point of the first outer membrane 103 may be located at the first end of the first electrode sheet 10, thereby maximizing the use of the space inside the cell. According to an embodiment of the present disclosure, in the innermost circle of the battery, the first inner membrane 102 corresponds to the second inner membrane 202, and the second electrode sheet 20 can be a cathode electrode sheet, such that the cathode membrane can be completely covered by the anode membrane, thereby minimizing the risk of lithium deposition.

Figure 4:
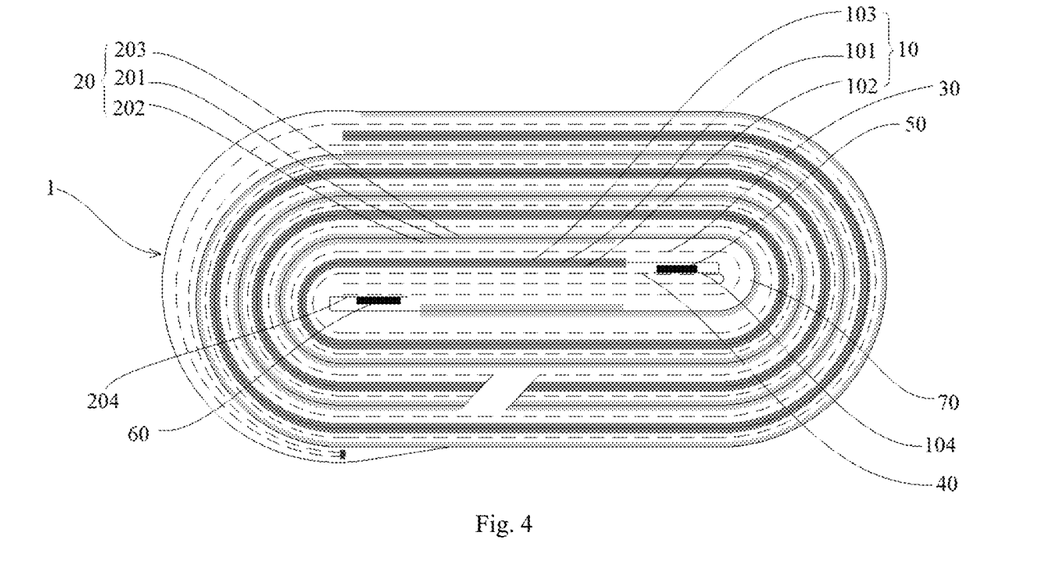
FIG. 4 is a structural schematic diagram of a cell according to a specific embodiment of the present disclosure.

Further, as shown in FIG. 4, for convenience of preparation, the first end of the first electrode sheet 10 is folded back inside the flat electrode assembly to form a first folded-back section 104, a folded-back point of the first folded-back section 104 being a first folded-back point; and/or the first end of the second electrode sheet 20 is folded back inside the flat electrode assembly to form a second folded-back section 204, a folded-back point of the second folded-back section 204 being a second folded-back point. The first electrode tab 50 is arranged on the first folded-back section 104, and the second electrode tab 60 is arranged on the second folded-back section 204, thereby improving the symmetry of the cell.

Figure 5:
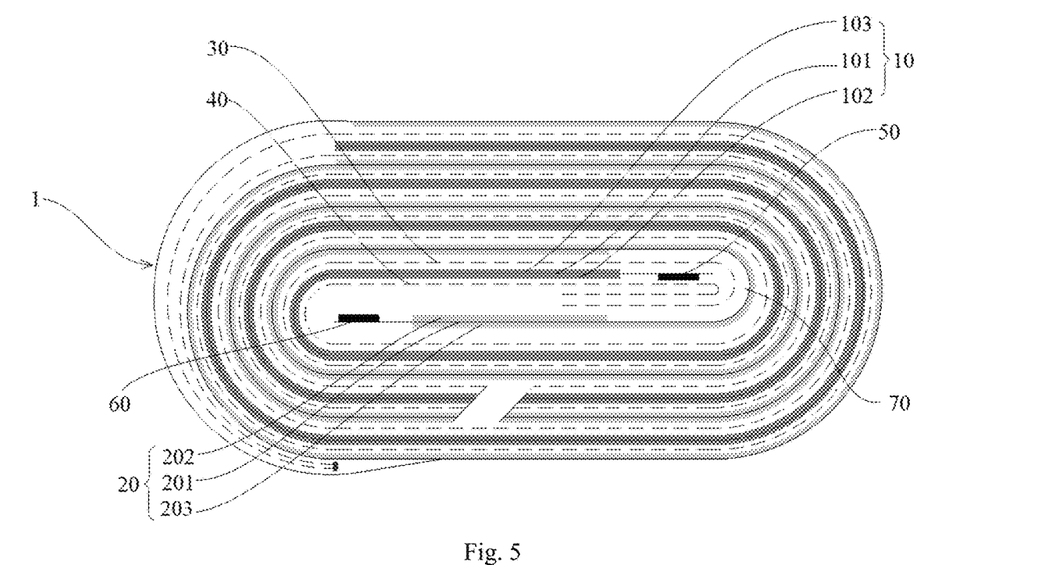
FIG. 5 is a structural schematic diagram of a cell according to a specific embodiment of the present disclosure.

According to an embodiment of the present disclosure, as shown in FIG. 5, in order to reduce the thickness of the cell, the sum of the first separator 30 and the second separator 40 which continuously overlap on the innermost side of the cell at a position corresponding to the first electrode tab 50 or the second electrode tab 60 does not exceed two layers in a thickness direction of the flat electrode assembly. Thereby the energy density is improved, raw materials are saved and the production cost of the battery is reduced.

Figure 6:
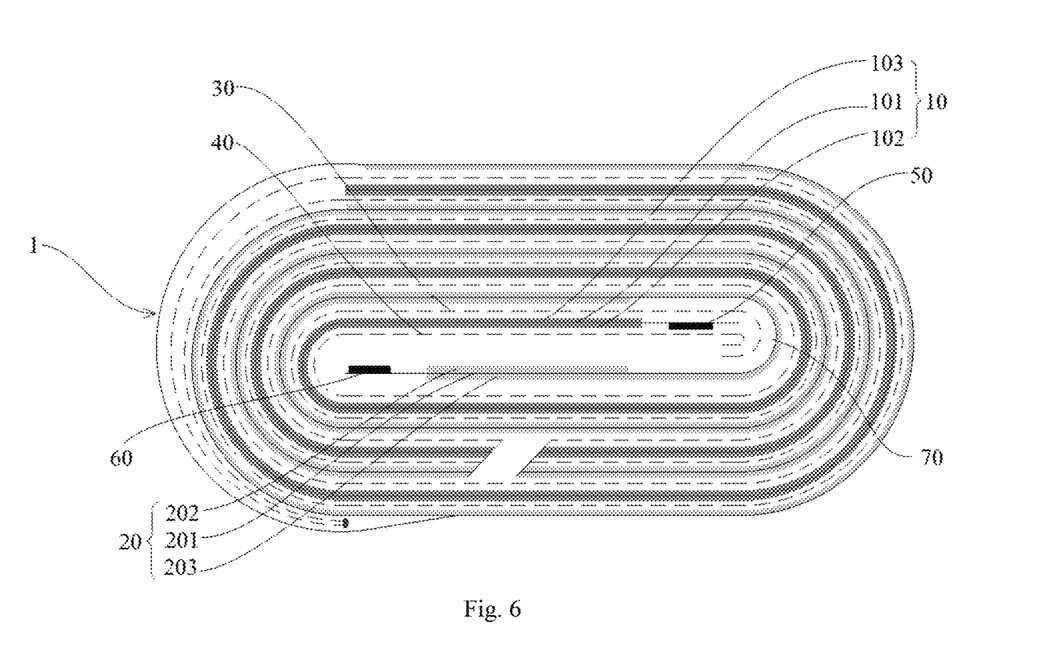
FIG. 6 is a structural schematic diagram of a cell according to a specific embodiment of the present disclosure.

According to an embodiment of the present disclosure, as shown in FIG. 6, in order to reduce the thickness of the cell, not more than two layers of the first separator 30 and the second separator 40 which continuously overlap on the innermost side of the cell at positions corresponding to the first electrode tab 50 and the second electrode tab in the thickness direction of the flat electrode assembly.

Figure 7:
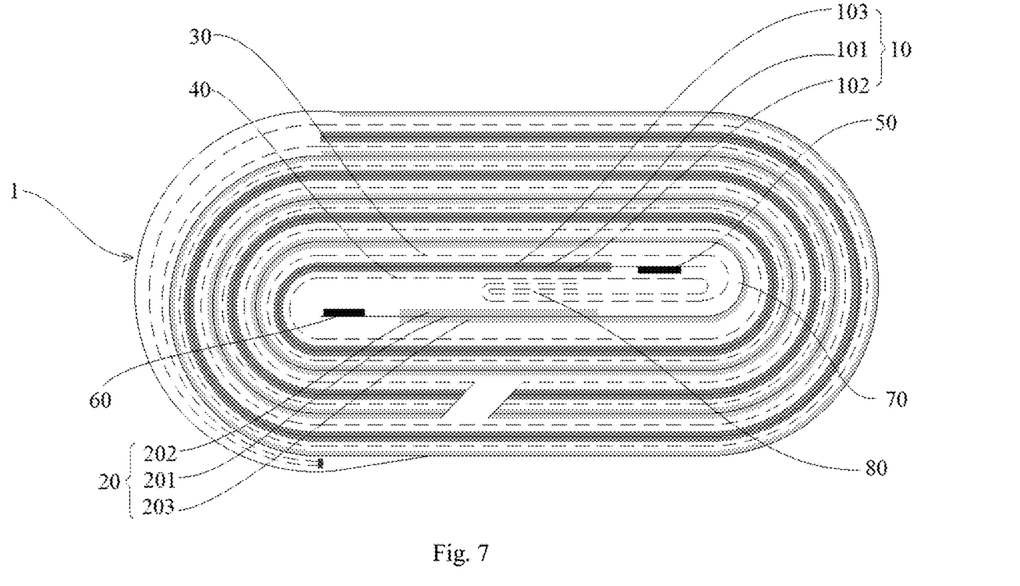
FIG. 7 is a structural schematic diagram of a cell according to a specific embodiment of the present disclosure.

In order to facilitate production without loss of energy density, according to an embodiment of the present disclosure, as shown in FIG. 7, the first end of the first separator 30 and the first end of the second separator 40 are folded back inside the flat electrode assembly to form a separator folded-back section 80. The design of the separator folded-back section 80 facilitates the fixation of the separators to a winding needle in a winding process of the cell, thereby facilitates production and improves the production efficiency.

According to an embodiment of the present disclosure, the first electrode sheet includes a first current collector 101, and a first outer membrane 103 and a first inner membrane 102 which are arranged on opposite surfaces of the first current collector 101. The first outer membrane 103 is arranged on the surface of the first current collector facing away from the center of the cell, and the first inner membrane 102 is arranged on the surface of the first current collector facing the center of the cell.

A point where a portion of the first electrode sheet 10 covered with the first inner membrane 102 and/or the first outer membrane 103 bends for the last time is denoted as a first tail bending point 105.

A point where a portion of the second electrode sheet 20 covered with the second inner membrane 202 and/or the second outer membrane 203 bends for the last time is denoted as a second tail bending point 205.

Figure 8:
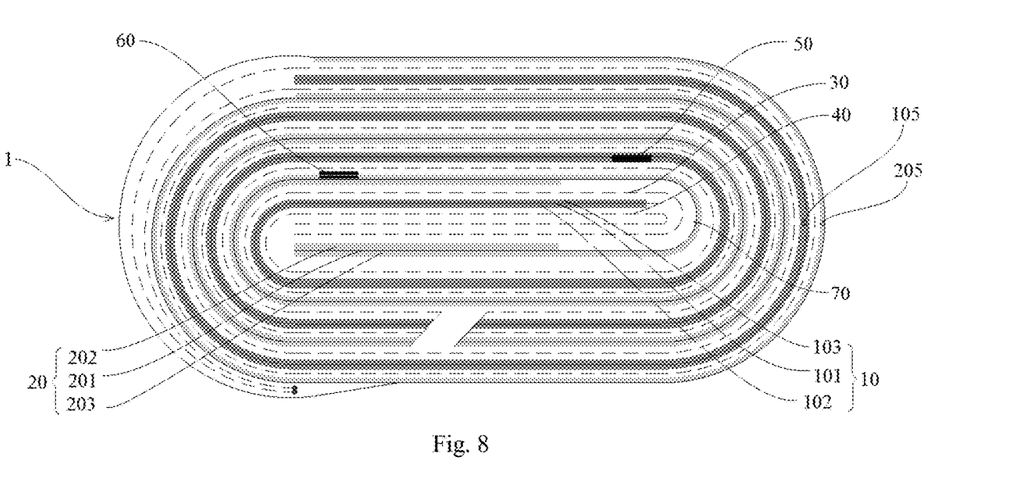
FIG. 8 is a structural schematic diagram of a cell according to a specific embodiment of the present disclosure.

As shown in FIG. 8, from the second bend 208 to the second tail bending point 205, the second inner membrane 202 or the second outer membrane 203 is provided with a second groove (not shown) that exposes a blank current collector, and the second electrode tab 60 is located in the second groove; and/or from the first bend 108 to the first tail bending point 105, the first inner membrane 102 or the first outer membrane 103 is provided with a first groove (not shown) that exposes a blank current collector, and the first electrode tab 50 is located in the first groove. That is, along a length direction of the current collector, the first electrode tab 50 or the second electrode tab 60 is located in the middle portion of the current collector. When the first electrode tab 50 or the second electrode tab 60 is located in the middle portion of the current collector, the starting ends of the second outer membrane 203 and the second inner membrane 202 can be located at the first end of the second electrode sheet 20, thereby further increasing the coating of the active material.

Figure 9:
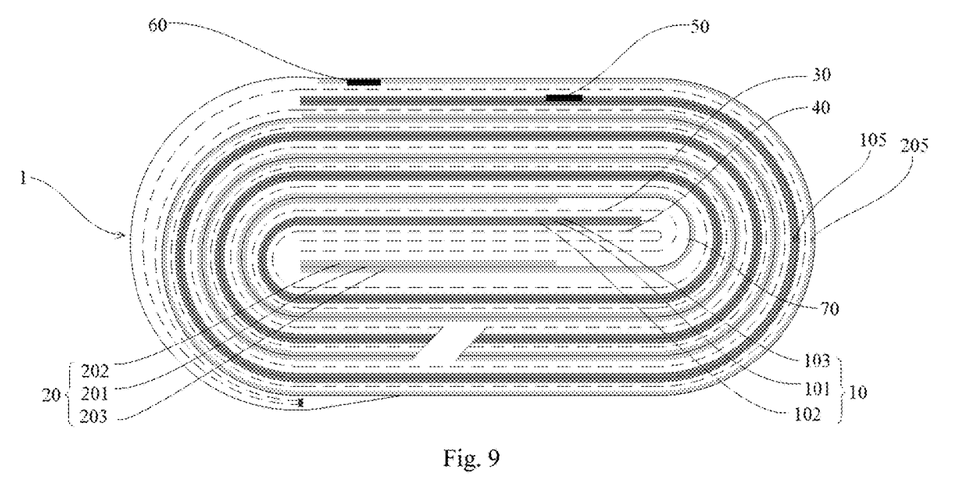
FIG. 9 is a structural schematic diagram of a cell according to a specific embodiment of the present disclosure.

As shown in FIG. 9, from the second tail bending point 205 to a tail end of the second electrode sheet 20, the second inner membrane 202 or the second outer membrane 203 is provided with a second groove (not shown) that exposes a blank current collector, and the second electrode tab 60 is located in the second groove; and/or from the first tail bending point 105 to a tail end of the first electrode sheet, the first inner membrane 102 or the first outer membrane 103 is provided with a first groove (not shown) that exposes a blank current collector, and the first electrode tab 50 is located in the first groove. That is, along the length direction of the current collector, the first electrode tab 50 or the second electrode tab 60 is arranged at the tail of the current collector. When the first electrode tab 50 or the second electrode tab 60 is arranged at the tail of the current collector, the starting ends of the second outer membrane 203 and the second inner membrane 202 can be located at the first end of the second electrode sheet 20, thereby further increasing the coating of the active material.

Figure 10:
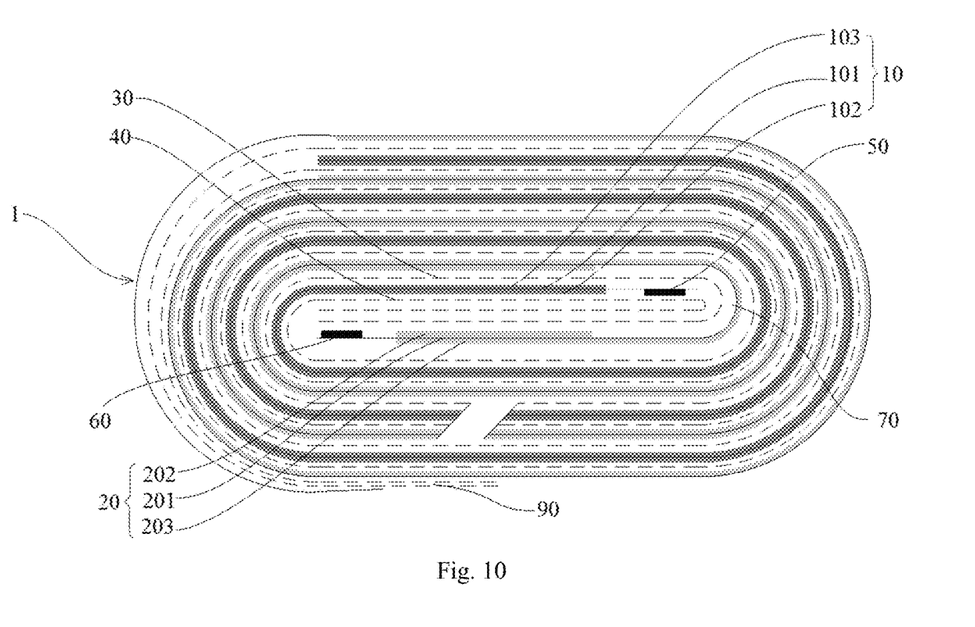
FIG. 10 is a structural schematic diagram of a cell according to a specific embodiment of the present disclosure.

According to an embodiment of the present disclosure, as shown in FIG. 10, in order to enhance adhesion between a cell and a packaging bag and improve the anti-dropping performance, a tail end of the cell 1 is provided with a separator end section 90 only consisting of the first separator 30 and the second separator 40, thereby increasing the friction between an outer side of the cell and the packaging bag to improve the anti-dropping performance of the battery. Also, the tail end of the cell 1 can be provided with a separator end section 90 only consisting of the first separator 30 or the second separator 40.

Figure 11:
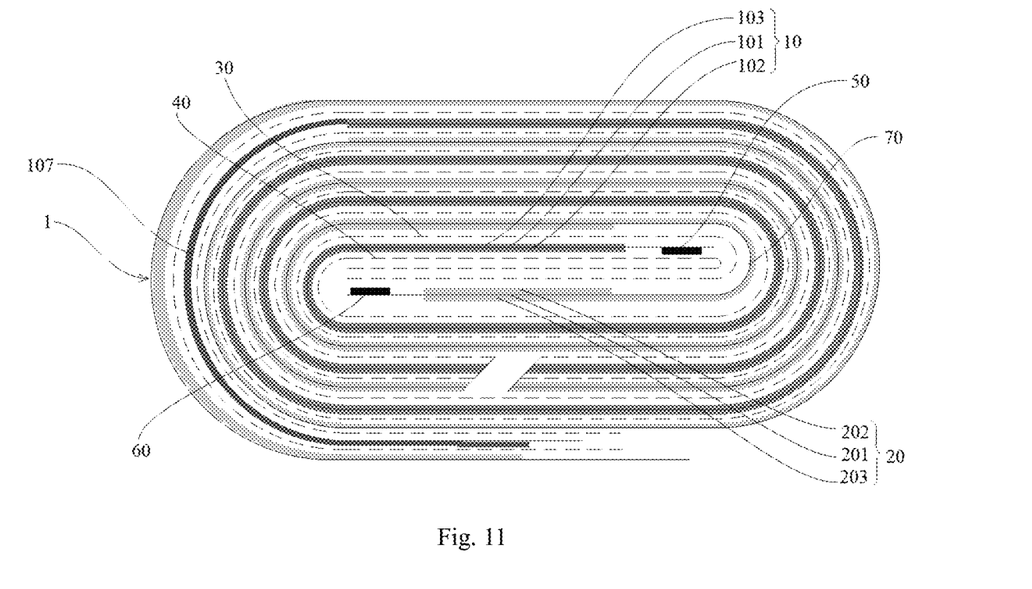
FIG. 11 is a structural schematic diagram of a cell according to a specific embodiment of the present disclosure.

According to an embodiment of the present disclosure, as shown in FIG. 11, the outermost circle of the first electrode sheet 10 includes a first uncoated region 107, and a portion of the second electrode sheet 20 opposite to the first uncoated region includes a second uncoated region. Therefore, the cell forms a protection structure consisting of the first uncoated region 107 facing the second uncoated region, such that a short circuit induced by the contact of a membrane with another membrane or a current collector with an opposite polarity is prevented when the cell is subject to abuse in occasions such as nailing or impact. The protection structure described above protects the cell from short circuit, and thus the safety performance of the cell is improved.

Figure 12:
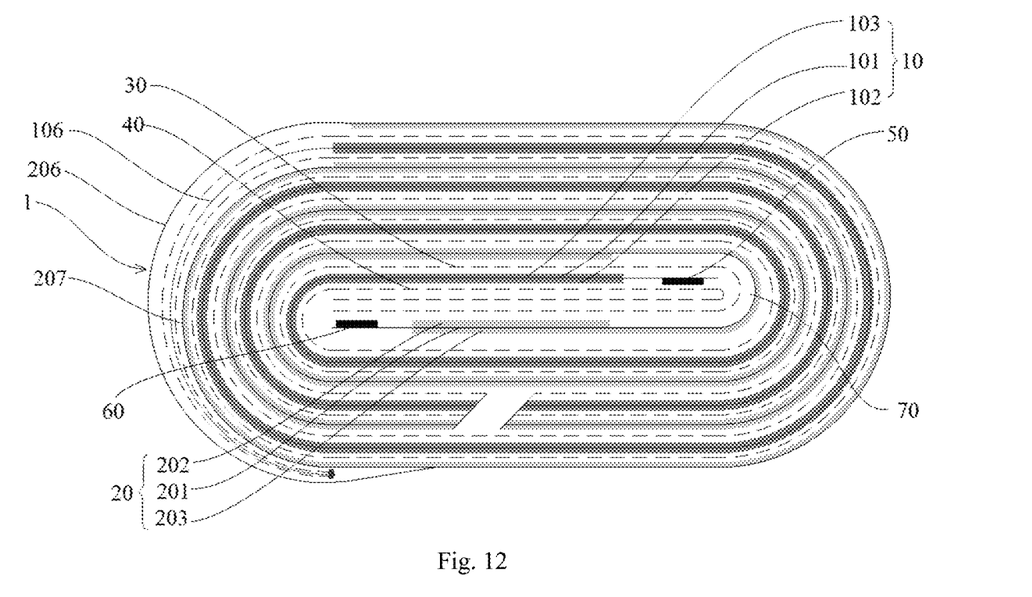
FIG. 12 is a structural schematic diagram of a cell according to a specific embodiment of the present disclosure.

According to an embodiment of the present disclosure, as shown in FIG. 12, the outermost circle of the first electrode sheet 10 includes a first bare portion 106, and a portion of the second electrode sheet 20 opposite to a surface of the first bare portion 106 facing the center of the cell includes a second bare portion 206. Therefore, an outer layer of the cell forms a protection structure consisting of the first bare portion 106 facing the second uncoated region, such that a short circuit induced by the contact of a membrane with another membrane or a current collector with an opposite polarity is prevented when the cell is subject to abuse in occasions such as nailing or impact, the protection structure described above protects the cell from short circuit, and thus the safety performance of the cell is improved.

Further preferably, according to an embodiment of the present disclosure, the electrode tab can be integrally formed with the current collector, for example, the electrode tab can be directly cut from the current collector. According to an embodiment of the present disclosure, the electrode tab can be formed separately and fixed to the corresponding bare portion of the current collector. According to an embodiment of the present disclosure, the electrode tab can be fixed to the uncoated region exposed at the groove of the electrode sheet. Preferably, after welding, the electrode tab and the current collector has a total thickness of less than or equal to 1.5 times of the total thickness of the electrode tab and the current collector, such that the electrode tab assembly has an appropriate thickness, and thus the defect of excessive welding resistance caused by excessive thickness of the electrode tab structure is avoided, the internal symmetry of the cell is improved, and the reliability of the electrode tab structure is enhanced, thereby avoiding deformation and upgrading the overall performance of the battery.

Although the present application is disclosed by way of the preferred embodiments, the claims shall not be limited thereto. Any possible variations and modification can be made without departing from the concept of the present disclosure. The protection scope of the present disclosure should be defined by the claims.

What is claimed is:

1. A cell, comprising:
a flat electrode assembly formed by superposing and winding a first electrode sheet, a separator, and a second electrode sheet from first ends thereof for a plurality of turns, a first electrode tab being connected to the first electrode sheet, and a second electrode tab being connected to the second electrode sheet;
wherein the separator includes a first separator and a second separator, the first separator separating the first electrode sheet and the second electrode sheet for a first subset of the plurality of turns, the second separator separating the first electrode sheet and the second electrode sheet for a second subset of the plurality of turns that is distinct from the first subset of the plurality of turns, and a sum of the first subset of the plurality of turns and the second subset of the plurality of turns equals to the plurality of turns;
wherein the second electrode sheet includes a second current collector, and a second membrane includes a second outer membrane and a second inner membrane arranged on opposite surfaces of the second current collector, the second outer membrane is arranged on a first surface of the second current collector facing away from a center of the cell, while the second inner membrane is arranged on a second surface of the second current collector facing the center of the cell;
wherein a center line in a width direction of the flat electrode assembly defines a cell midline, the first electrode sheet comprises a first bend where the first electrode sheet first bends, and the second electrode sheet comprises a second bend where the second electrode sheet first bends;
wherein the first bend and the second bend are located at two sides of the cell midline;
wherein a starting end of the second membrane is located on the second current collector between the first end of the second electrode sheet and the second bend; and
wherein at least at the second bend, the second current collector simultaneously includes (i) an inner uncoated region at the second surface, wherein the inner uncoated region is not provided with the second inner membrane and (ii) an outer coated region at the first surface, wherein the outer coated region is provided with the second outer membrane, wherein the inner uncoated region and the outer coated region are separated by the second current collector at least at the second bend.

2. The cell according to claim 1, wherein a head of the second electrode sheet extends from the first end of the second electrode sheet to the second bend, the second electrode tab is arranged on the head of the second electrode sheet, and a side of the second electrode tab away from the second bend is an outer side of the second electrode tab; the starting end of the second outer membrane and the starting end of the second inner membrane are located on the second current collector between the outer side of the second electrode tab and the second bend; and the second outer membrane or the second inner membrane is provided with a second groove, therefore a portion of the second current collector is exposed, the second electrode tab being located in the second groove.

3. The cell according to claim 1, wherein the first end of the first electrode sheet is folded back inside the flat electrode assembly to form a first folded-back section, a folded-back point of the first folded-back section defines a first folded-back point.

4. The cell according to claim 1, wherein in a thickness direction of the flat electrode assembly, not more than two layers of the separator continuously overlap on an innermost side of the cell at a position corresponding to the first electrode tab.

5. The cell according to claim 1, wherein at least one of the first end of the first separator and the first end of the second separator is folded back inside the flat electrode assembly to form a separator folded-back section.

6. (Withdrawn - Currently Amended) The cell according to claim 1, wherein a point where a portion of the second electrode sheet covered with the second membrane bends for the last time defines a second tail bending point; from the second bend to the second tail bending point, the second membrane is provided with a second groove, therefore a portion of the second current collector is exposed, the second electrode tab being located in the second groove.

7. The cell according to claim 1, wherein a point where a portion of the second electrode sheet covered with the second membrane bends for the last time defines a second tail bending point; from the second tail bending point to a tail end of the second electrode sheet, the second membrane is provided with a second groove, therefore a portion of the second current collector is exposed, the second electrode tab being located in the second groove.

8. The cell according to claim 1, wherein a separator end section consisting of the first separator and the second separator is provided at an end of the flat electrode assembly.

9. The cell according to claim 1, wherein an outermost circle of the first electrode sheet comprises a first uncoated region, and a portion of the second electrode sheet comprises a second uncoated region; the portion of the second electrode sheet is opposite to a surface of the first uncoated region facing the center of the cell.

10. The cell according to claim 1, wherein the outermost circle of the first electrode sheet comprises a first bare portion which is formed by extending the first current collector without coating, and a portion of the second electrode sheet comprises a second bare portion which is formed by extending the second current collector without the second membrane; wherein the second bare portion is opposite to a surface of the first bare portion facing away from the center of the cell.

11. The cell according to claim 1, wherein the first end of the second electrode sheet is folded back inside the flat electrode assembly to form a second folded-back section, a folded-back point of the second folded-back section defines a second folded-back point.

12. The cell according to claim 1, wherein in a thickness direction of the flat electrode assembly, not more than two layers of the separator continuously overlap on the innermost side of the cell at positions corresponding to the second electrode tab.

13. The cell according to claim 1, wherein the first electrode sheet comprises a first current collector, and a first membrane comprising a first outer membrane and a first inner membrane arranged on opposite surfaces of the first current collector; the first outer membrane is arranged on the first surface of the first current collector facing away from the center of the cell, while the first inner membrane is arranged on the second surface of the first current collector facing the center of the cell; and wherein a point where a portion of the first electrode sheet covered with the first membrane bends for the last time defines a first tail bending point; from the first bend to the first tail bending point, the first membrane is provided with a first groove,. therefore a portion of the first current collector is exposed, the first electrode tab being located in the first groove.

14. The cell according to claim 1, wherein the first electrode sheet comprises a first current collector, and a first membrane comprising a first outer membrane and a first inner membrane arranged on opposite surfaces of the first current collector; the first outer membrane is arranged on the first surface of the first current collector facing away from the center of the cell, while the first inner membrane is arranged on the second surface of the first current collector facing the center of the cell; and a point where a portion of the first electrode sheet covered with the first membrane bends for the last time defines a first tail bending point; from the first tail bending point to a tail end of the first electrode sheet, the first membrane is provided with a first groove,. therefore a portion of the first current collector is exposed, the first electrode tab being located in the first groove.

15. The cell according to claim 1, wherein a separator end section only consisting of the first separator or the second separator is provided at a tail end of the cell.

16. The cell according to claim 6, wherein the first groove is configured as a narrow groove with three sides surrounded by the membrane.

17. The cell according to claim 3, wherein a starting point of the first outer membrane is located between the first end of the first electrode sheet and the first bend.

18. The cell according to claim 3, wherein a starting point of the first outer membrane is located between the first end of the first electrode sheet to the first bend.

19. The cell according to claim 1, wherein:
the first electrode tab is integrally formed with the current collector; or
the first electrode tab is formed separately and fixed to a corresponding bare portion of the current collector.

20. The cell according to claim 1, wherein:
the first electrode sheet includes a first current collector; and
a total thickness of the connected first electrode tab and the first current collector including the connection is less than or equal to 1.5 times of a sum of the thickness of the first electrode tab and the first current collector.

* * * * *